United States Patent
Beck et al.

(10) Patent No.: US 6,454,543 B1
(45) Date of Patent: Sep. 24, 2002

(54) SELECTIVELY OPERABLE MULTIPLE PUMP ASSEMBLY

(75) Inventors: Erhard Beck, Weilburg; Hans-Dieter Reinartz, Frankfurt am Main; Helmut Steffes, Hattersheim; Peter Drott, Franfurt am Main; Jan Hoffmann, Schwalbach, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/700,459

(22) PCT Filed: May 6, 1999

(86) PCT No.: PCT/EP99/03116

§ 371 (c)(1),
(2), (4) Date: Apr. 12, 2001

(87) PCT Pub. No.: WO99/60271

PCT Pub. Date: Nov. 25, 1999

(30) Foreign Application Priority Data

May 15, 1998 (DE) .......................... 198 21 794

(51) Int. Cl.$^7$ .................. F04B 23/08; F04B 35/00; F04B 23/12; F04B 17/00; F04B 23/04

(52) U.S. Cl. .................. 417/199.1; 417/206; 417/429; 417/350; 417/423.1; 417/223; 417/316

(58) Field of Search .............. 417/199.1, 202, 417/206, 410.3, 429, 350, 360, 423.5, 423.1, 223, 316; 418/3, 259

(56) References Cited

U.S. PATENT DOCUMENTS

| | | | | | |
|---|---|---|---|---|---|
| 2,643,614 A | * | 6/1953 | Rosenkrans | .................. | 192/51 |
| 3,347,168 A | * | 10/1967 | Nixon | .......................... | 310/90 |
| 3,672,793 A | * | 6/1972 | Yowell | ........................ | 417/203 |
| 4,061,450 A | * | 12/1977 | Christy | ........................ | 418/253 |
| 4,470,772 A | * | 9/1984 | Gannaway | ................... | 417/368 |
| 5,181,937 A | * | 1/1993 | Niemiec | ..................... | 417/205 |
| 5,326,229 A | * | 7/1994 | Collins | ........................ | 417/201 |
| 5,395,216 A | * | 3/1995 | LIn | ............................ | 417/234 |
| 5,549,452 A | * | 8/1996 | Vogt | ....................... | 417/199.1 |

FOREIGN PATENT DOCUMENTS

| | | | | | |
|---|---|---|---|---|---|
| DE | 33 01 563 | * | 7/1984 | ........... | F04B/23/06 |
| DE | 38 11 773 | * | 10/1989 | ........... | F04B/23/04 |
| DE | 41 01 017 | * | 7/1991 | ........... | F04C/13/00 |
| DE | 195 42 654 | * | 5/1997 | ........... | B60T/13/66 |
| DE | 197 04 248 | * | 8/1998 | ........... | B60T/17/02 |
| GB | 1602237 | * | 11/1981 | ........... | F04B/23/04 |
| WO | 93 18303 | * | 9/1993 | ........... | F04B/39/02 |

* cited by examiner

Primary Examiner—Charles G. Freay
Assistant Examiner—Timothy P. Solak
(74) Attorney, Agent, or Firm—Rader, Fishman & Grauer PLLC

(57) ABSTRACT

The present invention relates to a space-saving and weight-saving motor-and-pump assembly which comprises a drive motor and a pump unit driven by the shaft of the said motor. In order to supply in parallel as many media as possible with an assembly of this type, the present invention suggests the additional integration of at least one second pump unit, driven by the motor shaft of the drive motor, into the motor-and-pump assembly.

9 Claims, 2 Drawing Sheets

SELECTIVELY OPERABLE MULTIPLE PUMP ASSEMBLY

TECHNICAL FIELD

The present invention generally relates to a motor-and-pump assembly and more particularly relates to a motor that is selectively engaged to two or more pumps.

BACKGROUND OF THE INVENTION

Motor-and-pump assemblies of this type are used in many applications and are especially fit for employment in automotive vehicles. A motor-and-pump assembly comprised of a pump unit and an electric motor driving the said assembly is disclosed, for example, in DE 43 15 826 A1. The pump unit is configured as a radial piston pump and designed for use in automotive vehicle brake systems to supply brake fluid. Patent application DE 197 07 248.1, which has not yet been published, describes a brake system for automotive vehicles comprising a motor-and-pump assembly which generates by means of a pump a pneumatic pressure below atmospheric pressure for the operation of a brake force booster, on the one hand, and generates by means of another pump a hydraulic pressure for the operation of a slip control device, on the other hand.

In addition to the media referred to hereinabove, there is the demand for the supply of further media in an automotive vehicle. Usually, additional motor-and-pump assemblies are used to supply these media such as fuel and water. Because the economy of weight and space is nowadays a major objective in the automotive vehicle industry, it is disadvantageous to use a large number of motor-and-pump assemblies in an automotive vehicle which cause additional weight and require additional space.

An object of the present invention is to provide a motor-and-pump assembly which is capable of supplying as many media as possible in parallel and which thereby minimizes weight and space requirements.

One essential advantage of the present invention is that at least two pump units are generated by a joint drive motor, whereby weight and space is economized due to the omission of the otherwise required further drive motors.

Principally, each one of the pump units can comprise any possible pump principle. Thus, the pumps may e.g. be configured as piston pumps, vane-type pumps, or gear-type pumps. To enable simultaneous or separate operation of the pump units, a freewheeling device may be arranged in each case between the motor and the pump unit. This renders it possible to operate the pumps individually or jointly depending on the direction of rotation of the motor. Depending on the structural volume requirement of the pump units, they may be arranged within or outside the motor housing. When the pump units are favorably preassembled as subassemblies, the pump units may also be flanged from the outside to the motor housing.

DETAILED DESCRIPTION OF THE PREFERRED EMBODIMENTS

Figure 1:
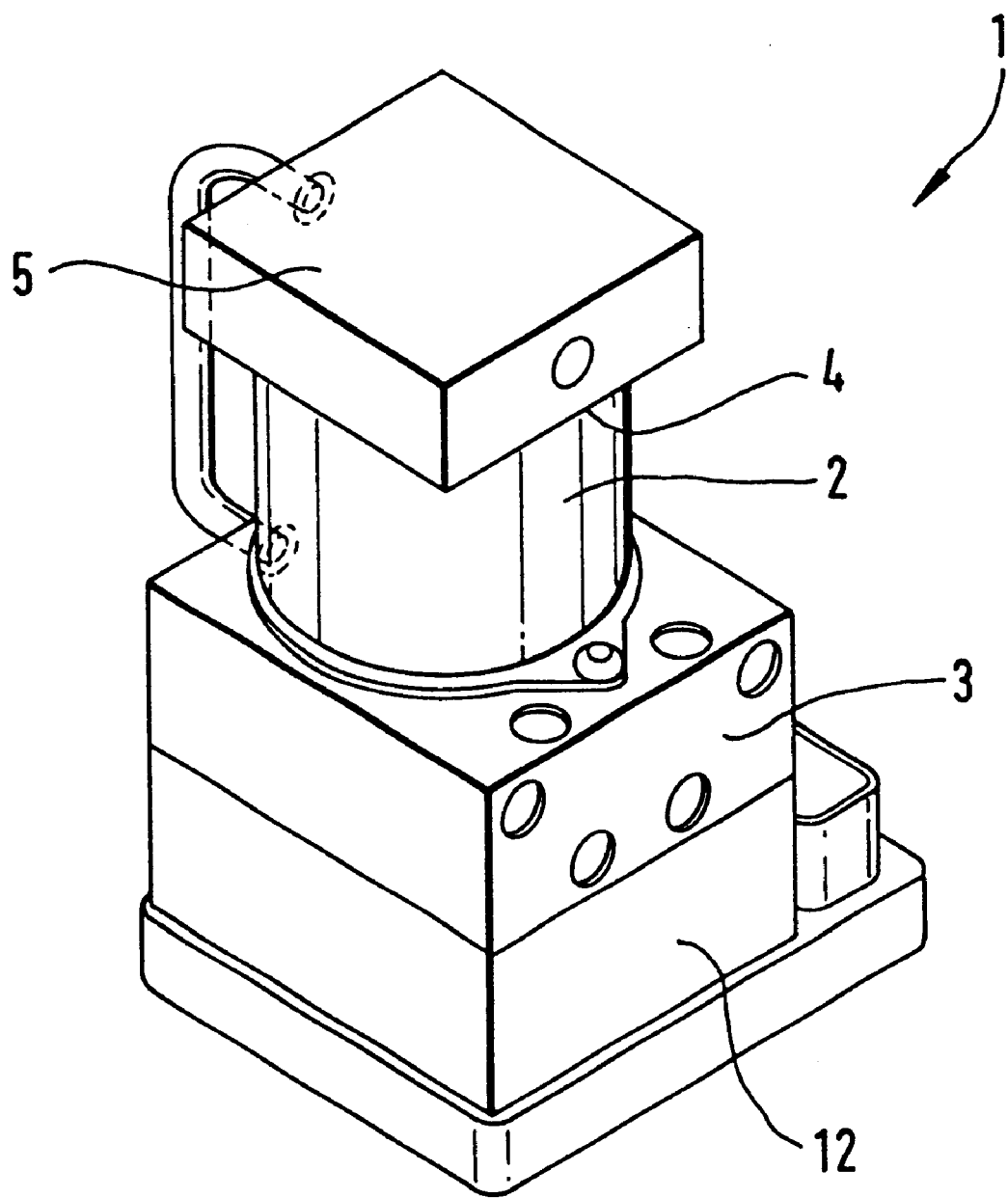
FIG. 1 is a perspective view of a first favorable embodiment of the motor-and-pump assembly of the present invention.

The embodiment of FIG. 1 represents a motor-and-pump assembly 1 which is used in electronically controlled brake systems for automotive vehicles. The pumps 3, 5 of the motor-and-pump assembly 1 which are configured as radial piston pumps are designed for the supply of brake fluid. The assembly comprised of drive motor 2, first pump unit 3, and electronic control unit 12 represents a per se known motor-and-pump assembly of an electronically controlled brake system for automotive vehicles. This assembly is extended by a second pump unit 5. The second pump unit 5 is arranged on the second front face 4 of motor 2 opposite to the first pump unit 3. Both pump units are driven by a shaft (not shown) of the electric motor 2. Further, a freewheeling drive (not shown) is interposed between the second pump unit 5 and the motor 2. This freewheeling drive permits a joint or separate operation of both pumps, depending on the direction of rotation of the motor. In this arrangement, the second pump unit 5 acts as a precharging pump in the electronically controlled brake system.

Figure 2:
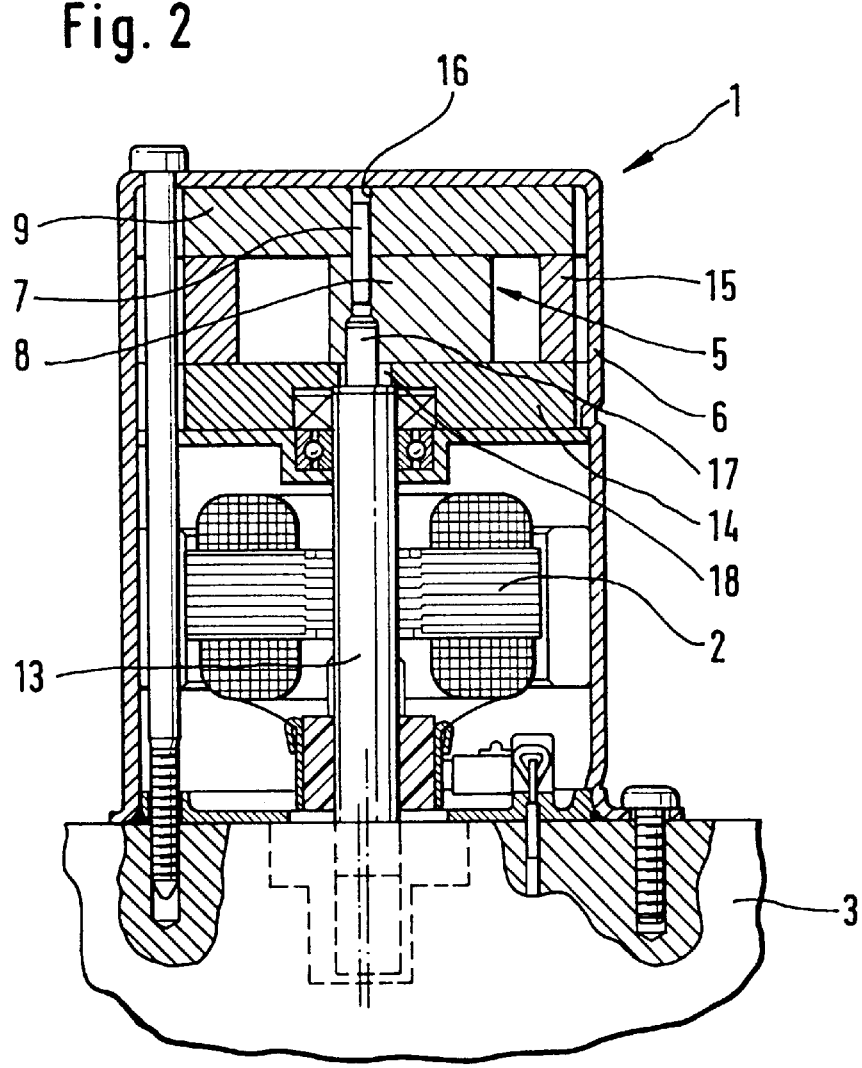
FIG. 2 is a cross-sectional view of a second embodiment of the motor-and-pump assembly of the present invention.

The embodiment of FIG. 2 shows another motor-and-pump assembly 1 for use in electronically controlled brake systems, whose basic module is also composed of a drive motor 2, a first (shown only in sections) pump unit 3, and an electronic control unit (not shown) The assembly 1 is extended by a second pump unit 5 which is arranged in the motor housing 6. The second pump unit 5 is arranged on the side of the drive motor opposite to the first pump unit 3. The pump unit 5 is designed as a vane-type pump herein. It is composed as a complete construction unit of a base plate 14, a housing 15, the cover 9, and a rotor B. The pivot pin 7 arranged in the cover 9. The pivot pin 7 accommodates the rotor 8 and the radial bearing forces. In axial alignment with the accommodating bore 16 of the pivot pin 7, a recess is indented into the rotor 8 for the accommodation of an entraining element 17 for driving the pump. The entraining element 17 is arranged on the drive-side end of the motor shaft 13 of the drive motor 2. Shaft 13 extends through an opening 18 in the base plate 14 into the pump unit 5.

The illustrated design of the pump unit 5 favorably permits completely preassembling the pump unit 5 and then completing it with a standard motor.

Figure 3:
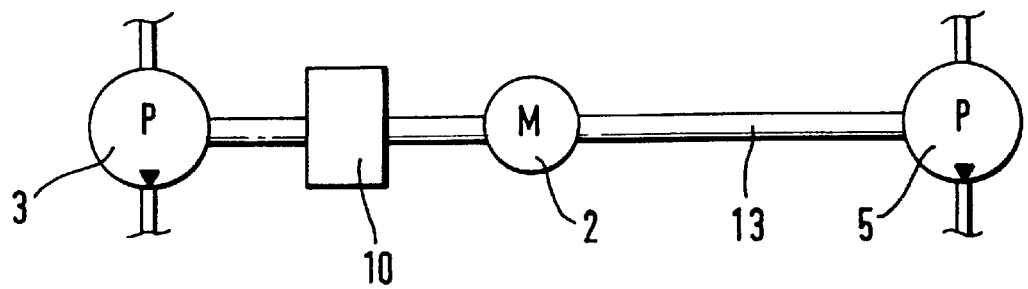
FIG. 3 is a block diagram view of a motor-and-pump assembly according to FIG. 1 or 2.

The embodiment of FIG. 3 shows a block diagram of the motor-and-pump assembly according to FIG. 1 or 2 which includes the drive motor 2, the pump units 3 and 5, and a freewheeling device 10, which is interposed between the drive motor and the pump unit 3, for example. The freewheeling device 10 permits the independent operation of the two pumps 3 and 5. The drive control of the pump units 3 and 5 is predetermined by the direction of rotation of the electric motor. Depending on the direction of rotation, both pump units can be operated parallel and separately of each other. To this end, the freewheeling device 10 is arranged between the drive motor 2 and the pump unit to be operated individually. The arrangement of the freewheeling device 10 between the pump unit 3 and the drive motor 2 permits the separate operation of the pump unit 3 and the parallel operation of the pump units 3 and 5. Accordingly, the integration of the freewheeling device 10 between the pump unit 5 and the drive motor 2 permits the separate operation of the pump unit 5 and the parallel operation of the pump units 5 and 3.

The present invention is not limited to the two embodiments. Thus, it is e.g. possible to arrange the pump units 3, 5 on a front face of the drive motor 2 and to operate them by means of an interposed freewheeling device 10 independently of one another or in parallel. The operation of the motor-and-pump assembly 1 is also not limited to the integration of two pump units 3, 5. It is possible that several pump units can be operated independently of each other by a drive motor 2 when there is provision of a distributor gear and a corresponding combination of freewheeling devices with the gear unit and the pump units.

What is claimed is:

1. Motor-and-pump assembly, comprising:
   a drive motor having a dry motor housing,
   a first pump unit driven by a shaft of the drive motor,
   a second pup unit driven by the shaft of the drive motor, wherein the second pump unit is contained within the motor housing and is a completely self contained, pre-assembly including, a pump housing, a pump cover, a pump base plate, and a pump rotor.

2. Motor-and-pump assembly as claimed in claim 1, wherein the second pump unit is attached to the drive motor housing opposite to the first pump unit.

3. Motor-and-pump assembly as claimed in claim 1, wherein the second pump unit is a vane-type pump.

4. Motor-and-pump assembly as claimed in claim 3, wherein a pivot pin is arranged in the cover of the vane-type pump.

5. Motor-and-pump assembly as claimed in claim 4, wherein the rotor of the vane-type pump is mounted on a pivot pin.

6. Motor-and-pump assembly as claimed in claim 1, wherein the second pump unit is a piston pump.

7. Motor-and-pump assembly as claimed in claim 1, wherein one of the two pump units is connected to the drive motor by means of a freewheeling device.

8. Motor-and-pump assembly as claimed in claim 7, wherein the second pump unit is selectively connected and disconnected for parallel operation with the first pump unit by means of the freewheeling device depending on the direction of rotation of the motor.

9. Motor-and-pump assembly as claimed in claim 7, wherein the first pump unit is selectively adapted to be connected and disconnected for parallel operation with the second pump unit by means of the freewheeling device depending on the direction of rotation of the motor.

* * * * *

UNITED STATES PATENT AND TRADEMARK OFFICE
CERTIFICATE OF CORRECTION

PATENT NO.     : 6,454,543 B1
DATED          : September 24, 2002
INVENTOR(S)    : Beck et al.

It is certified that error appears in the above-identified patent and that said Letters Patent is hereby corrected as shown below:

Column 3,
Line 8, change "a second pup unit" to -- a second pump unit --

Signed and Sealed this

Eleventh Day of February, 2003

JAMES E. ROGAN
*Director of the United States Patent and Trademark Office*